Patented May 10, 1938

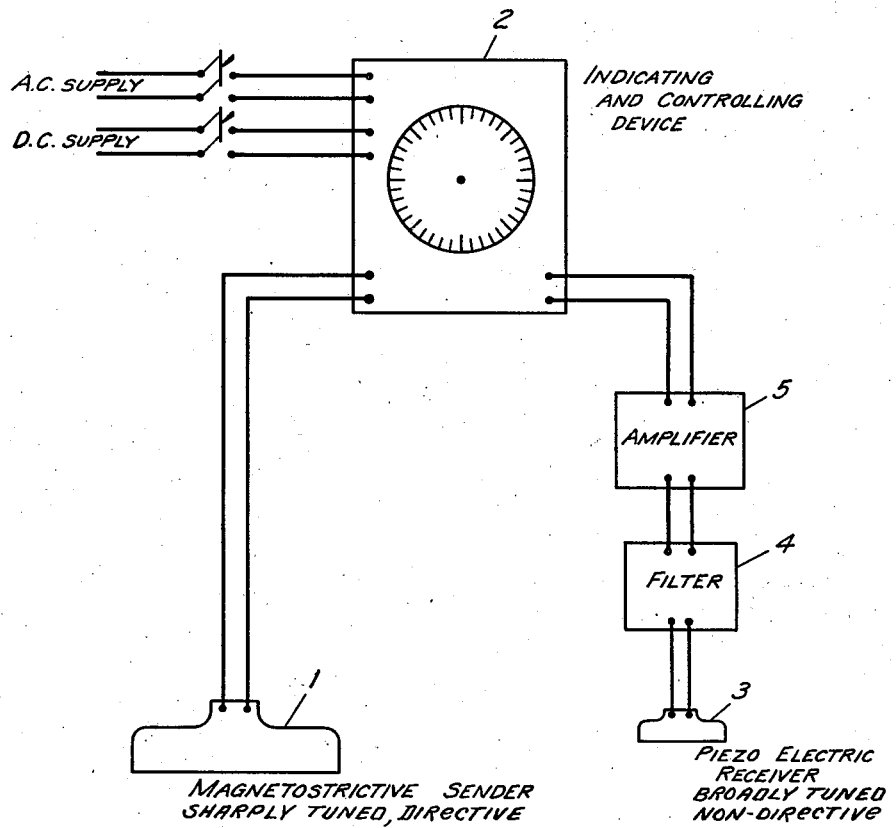

2,116,523

UNITED STATES PATENT OFFICE 2,116,523

SYSTEM AND METHOD OF DISTANCE AND DEPTH MEASUREMENT

Willy Kunze, Bremen, Germany, assignor to Submarine Signal Company, Boston, Mass., a corporation of Maine Application December 8, 1933, Serial No. 701,507
In Germany March 18, 1933

4 Claims. (Cl. 177—386)

The present invention relates to a system for distance and depth measurement particularly by the echo method in which the time is measured between the emission of a compressional wave signal and the receipt of the reflected wave or echo. More particularly the present invention relates to such systems in which compressional waves of a frequency in the vicinity of, or higher than, the audible limit are employed. The invention especially relates to distance and depth measurement systems for use under water.

High-frequency echo sounding systems have already been employed in the prior art. Compressional waves for use in these systems have been produced and received by a number of different arrangements. For this purpose magnetostrictive or piezo-electric devices have been quite successful. In the prior systems, however, it has been customary to use, for example, a magnetostrictive sender and to use the same instrument or a similar instrument subsequently as a receiver of the reflected wave. On the other hand, piezo-electric senders have been employed together with the same instrument or a similar device for receiving the reflected wave.

Experience with the systems of the prior art has shown them to be subject to a number of disadvantages. If the same instrument is used both for sending and receiving the signals, a switching operation must be performed between the signal emission and the receipt of the reflected wave or if the receiving circuit is continually connected with the sender, special precautions must be taken to prevent the high voltage and power employed in sending from reaching the receiving circuit.

Furthermore, the sender can not immediately after emission be used as a receiver since it requires a definite time for the device to come to rest. On the other hand, where two similar units have been employed, one for sending the signal and one for receiving the reflected signal, it has been customary to tune both instruments quite accurately to the same frequency. This is not only expensive but also is very difficult to carry out in practice both with magnetostrictive and piezo-electric devices. Besides this, their tuning does not always remain constant but often changes in the course of time. With the arrangements which have been used heretofore no success has been obtained unless both instruments were tuned accurately to the same frequency. Furthermore, a device operating on the magnetostrictive principle is extremely insensitive as a receiver of waves differing from its resonant frequency. These difficulties have been overcome by the present invention.

According to the invention the system is such that for sending the signals a magnetostriction sender is employed, but for receiving the reflected signals or echo a piezo-electric receiver is used. The sender is sharply tuned to a definite frequency which is very easily accomplished. The receiver, on the other hand, is designed not to have any sharp tuning, but rather to be sensitive over a broad frequency band. The receiver may even be made aperiodic.

It has been found that piezo-electric receivers which have very small dimensions can be produced very easily and be made to have great sensitivity particularly by employing Rochelle-salt crystals. Such receivers have good sensitivity even though the phenomenon of resonance is not called into play. This is true even for high frequencies while receivers which operate on the magnetostrictive principle, on the contrary, have a good efficiency only when the phenomenon of resonance is made use of.

When the magnetostrictive sender of a system according to the present invention is energized, a pulse of definite frequency is transmitted. The Rochelle-salt receiver responds to the reflected pulse regardless of whether the frequency of the sender is still the same as its original tuning or whether it has changed to a higher or lower frequency. Should the receiver be aperiodic, then it will respond immediately with full intensity and will not require an initial transitory period in which to build up its vibrational amplitude, as is the case with sharply tuned receivers. In the measurement of very short time intervals, that is of short distances, this is of particular importance.

The invention may be further understood by reference to the accompanying drawing which shows schematically a depth sounding system according to the present invention.

A magnetostrictive sender 1 is energized through a controlling device 2. The reflected wave is received by the piezo-electric Rochelle salt receiver 3. The electric energy from the receiver is conducted through a filter 4 and subsequently to an amplifier 5, thence to the device 2 which also contains the indicating arrangement.

The sender can be installed in a ship in the usual manner. In view of the small size of the receiver this also is easily installed and occupies but little space. It should be noted that the magnetostrictive sender should be designed to have a sharp directional effect so that the compressional waves produced are radiated substantially in a single direction only and for depth measurement directly downwards.

The receiver, on the other hand, must be designed to have only a slight directional effect or even none at all. This overcomes the difficulty with prior arrangements in which the senders and receivers both had a sharp directional effect. With these arrangements it was found that frequently when the ship rolled or when the sea bottom had a steep slope, the echo was not received at all for the reason that it never reached the receiver, since the direction from which the echo arrived did not coincide with the direction in which the receiver was sensitive.

The indicating device which operates to measure the time interval between the sound emission and the return of the echo and to indicate the distance or depth on a scale may, of course, be constructed according to any of the known arrangements. A magnetostrictive sender may be operated by a direct current impulse or by the discharge of a condenser. The piezo-electric receiver, as has been noted, is connected to the indicator through an amplifier and a filter. The filter is particularly useful for cutting out low frequency disturbing noises.

The system according to the present invention may be used, of course, not only for depth sounding in which the signal is sent in a vertical direction, but also for horizontal distance measurement to locate invisible distant objects both as to their direction and their distance.

Having now described my invention, I claim:

1. In a system for distance and depth measurement comprising, in combination, a sharply tuned high frequency compressional wave beam transmitter adapted to transmit a high frequency beam of compressional waves, a piezo-electric receiver having a broad resonance within the range of the transmitter and adapted to receive compressional wave energy substantially from all directions, means operatively connected with said receiver for filtering out all compressional wave energy received below the frequency of the transmitter, amplifying means for amplifying the compressional waves of the transmitted frequency and means operatively connected both to said amplifier and said transmitter for controlling moment of operation of the transmitter and responsive to the energy impressed by the amplifier for indicating the instant of the receipt of the compressional wave.

2. A system for depth and distance measurement comprising, in combination, a sharply tuned high frequency compressional wave beam transmitter having a relatively small solid angle in which the beam is transmitted, a piezo-electric receiver having a broad resonance within the range that the transmitter operates and responsive to compressional waves from a relatively large solid angle as compared to that of the transmitter, means operatively associated with the transmitter and receiving means for controlling the moment of operation of the transmitter and responsive to the energy picked up by the receiver, said means including also means for indicating the time of travel of the compressional waves between the transmitter and receiver.

3. In a system for depth and distance measurement comprising, in combination, a sharply tuned high frequency compressional wave beam transmitter having a relatively small solid angle in which the beam is transmitted, a piezo-electric receiver having a broad resonance within the range that the transmitter operates and responsive to compressional waves from a relatively large solid angle as compared to that of the transmitter, means operated by said receiving means for filtering out compressional wave energy other than the transmitted frequency and means connected with said filter means for amplifying said transmitted frequency and indicating means responsive to the amplifying means for indicating the instant of reception of the transmitted wave.

4. A system for depth and distance measurement comprising, in combination, a magnetostrictive sharply tuned high frequency compressional wave beam transmitter adapted to transmit a high frequency beam of compressional waves, a piezo-electric receiver having a broad resonance within the range that the magnetostrictive sender operates and adapted to receive compressional wave energy substantially from all directions, means operatively associated with the transmitting and receiving means for controlling the moment of operation of the transmitter and responsive to the energy picked up by said receiver, said means including also means for indicating the time of travel of the compressional waves between the transmitter and receiver.

WILLY KUNZE.